Nov. 1, 1960      H. A. MEAD      2,958,173

APPARATUS FOR PRODUCING FOOD PACKAGES

Filed Sept. 24, 1956      3 Sheets-Sheet 1

INVENTOR.
HARRY A. MEAD
BY
Horace B. Van Valkenburgh
ATTORNEY

Nov. 1, 1960 H. A. MEAD 2,958,173
APPARATUS FOR PRODUCING FOOD PACKAGES
Filed Sept. 24, 1956 3 Sheets-Sheet 2

INVENTOR.
HARRY A. MEAD
BY
Horace B. Van Valkenburgh
ATTORNEY

Nov. 1, 1960     H. A. MEAD     2,958,173
APPARATUS FOR PRODUCING FOOD PACKAGES
Filed Sept. 24, 1956     3 Sheets-Sheet 3

*INVENTOR.*
HARRY A. MEAD
BY
*ATTORNEY*

United States Patent Office 2,958,173
Patented Nov. 1, 1960

2,958,173

APPARATUS FOR PRODUCING FOOD PACKAGES

Harry A. Mead, Lakewood, Colo., assignor to Butter-Pak, Inc., Denver, Colo., a corporation of Colorado Filed Sept. 24, 1956, Ser. No. 611,793

8 Claims. (Cl. 53—178)

This invention relates to food packages and more particularly to apparatus for producing the same, being particularly concerned with food packages containing individual food items which are normally similar or identical in shape, such as butter pats.

In the usual distribution of butter, this food product is packaged in one pound or one quarter pound cubes which may be precut by machine, but are more often cut into pats or rectangular pieces just prior to use, as at a restaurant, hotel or the like. Butter must be kept cool to prevent spoilage at room temperature, and butter pats may be placed on trays to be left in a refrigerator or may merely be placed in a dish or other receptacle along with ice. Transfer of the butter pats from a tray or dish to a butter plate or a small individual receptacle, such as formed of cardboard or the like, as by a waitress, involves either tedious and time-consuming handling with a fork or other pointed instrument, or manual handling. The latter is most expeditious and therefore more generally employed, but is unsanitary and thus a matter of concern to numerous health departments. If butter pats could be packaged in individual closed packages, to be opened only by the ultimate user, the unsanitary aspects of manual handling could be avoided while retaining the speed thereof. However, no feasible way of economically producing a satisfactory package has apparently been proposed.

Among the objects of this invention are to provide a novel apparatus for producing a food package which is particularly adapted to contain a relatively small item of food, such as a butter pat; to provide such apparatus which will produce such a package which will permit the food item to be stored, cooled and handled with ease and simplicity; to provide such apparatus which will produce such a package which may be handled manually without contaminating the food item enclosed therein; to provide such apparatus which will produce such a package which does not interfere with refrigeration or ice cooling of the food item contained therein; to provide such apparatus with which relatively inexpensive material may be used; and to provide such apparatus which is relatively simple in construction, yet effective and economical in operation.

The foregoing and additional objects of this invention, as well as the novel features thereof, will become apparent from the description which follows, taken in connection with the accompanying drawings, in which.

Figure 1:
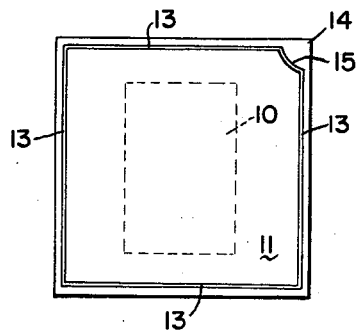
Fig. 1 is a top plan view of a food package produced by the apparatus of this invention, containing a butter pat.
Figure 2:
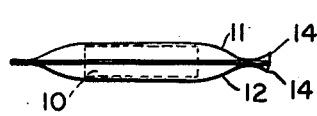
Fig. 2 is a side elevation of the food package of Fig. 1.

As illustrated in Figs. 1 and 2, a food package produced in accordance with this invention may enclose a food item, such as a butter pat 10, which is disposed between an upper layer or sheet 11 and a lower layer or sheet 12, each conveniently formed of heat sealable material, such as cellophane, polyethylene, Pliofilm, or other suitable material, such as plastic, metal foil or the like. Sheets 11 and 12 may also be provided with a coating of a wax-like or other substance which will prevent the food item from adhering to the layers. The sheets 11 and 12 are conveniently rectangular and are sealed together around their peripheral edges, as along a line 13 extending around each of the edges and closely adjacent to each edge, except at a corner 14. At the corner 14, the sheets 11 and 12 are sealed together along a line 15 which is spaced from the point of the corner and conveniently along a generally arcuate line whose approximate center is outwardly therefrom, such as at the position of the point of each corner 14. Due to the effect of sealing along line 15, each corner 14 tends to be distorted or separated from the corner 14 of the opposite sheet, as shown in Fig. 2. Thus, the corners 14 provide a convenient position for each of the sheets 11 and 12 to be grasped by the user to open the package, as by tearing one sheet away from the other for separation along the sealing lines or adjacent thereto. It is to be noted that while the food package is preferably rectangular and more conveniently square in shape, it may have any other suitable shape, so long as at least one corner is provided. Also, although only one corner of the package is shown as provided with a sealing line spaced therefrom, one or more or even all of the corners may be so provided.

Figure 4:
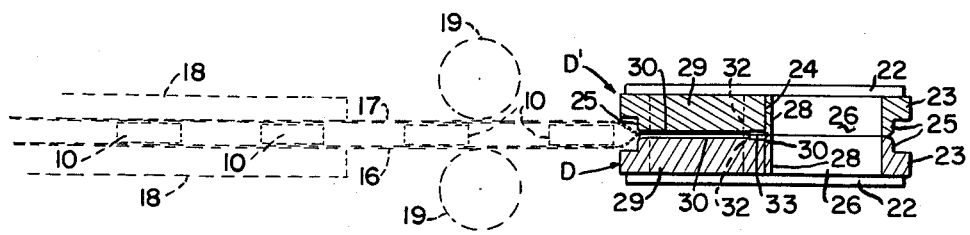
Fig. 4 is a longitudinal section of apparatus, which includes the lower die of Fig. 3 and also a cooperating upper die, the dies being in offset section taken along line 4—4 of Fig. 3, with upper and lower strips of heat sealable material, between which butter pats are interposed, being shown in dotted lines in the position in which the same are fed to the dies.

In the apparatus of the present invention, a plurality of food items, such as butter pats, are placed preferably by machine in spaced positions, i.e. in both longitudinal and lateral rows, on a lower strip of heat sealable material, such as lower strip 16 of Fig. 4 with an upper strip 17 being placed over the food items, such as butter pats 10. The food items may be retained in position between the strips in any suitable manner, as by very light pressure from guides 18 and feed rollers 19, or the like. The strips 16 and 17, with the butter pats therebetween, may be fed intermittently by rollers 19 between a pair of dies D and D', of Fig. 4, which close to seal the strips around each pat and along lines corresponding to the sealing lines 13 and 15 of Fig. 1, after which the dies are opened, the sealed portion of the strips removed and the next portion to be sealed moved between the dies. If desired, the strips with the butter pats between, represented by the single line 20 of Fig. 5, may be fed continuously between a pair of heating assemblies H and H' by which the upper and lower strips, around each butter pat, may be sealed along lines corresponding to lines 13 and 15 of Fig. 1. After the sealing operation, the individual food packages are severed from the strips, as by cutting wheels operating along the line between two longitudinal rows of food packages and one or more transverse cutting blades or the like, or by rotating cutting wheels, such as cutting wheels C and C' of Fig. 5, which may be operated continuously when used in conjunction with the continuously rotating heating assemblies H and H' of Fig. 5 or may be operated intermittently when operated in conjunction with the dies D and D' of Fig. 4. It will be understood, of course, that the individual packages may be severed from the strips in any other suitable manner. In any event, the final result is a plurality of individual food packages, each embodying the novel features of the food package of Figs. 1 and 2, which adequately protect the food during handling, but are readily opened by the user.

The dies D and D' are similar in construction but disposed in opposed relationship and are provided with suitable heating devices, such as electrical resistance heaters 22 attached to the top of upper die D' and to the bottom of lower die D. Each die D and D' may be formed from a grid-like block or base 23, it being understood that the line 24 of Fig. 4 is the line of the "break" in section line 4—4 of Fig. 3 and that while dies D and D' are shown as adapted to seal eight packages simultaneously, i.e., two rows of four abreast, the number of packages to be sealed may be increased or decreased, while the strips 16 and 17 with the butter pats therebetween may be fed lengthwise of the dies rather than across the same, as shown. It is most convenient for the dies to seal four packages or a multiple of four packages simultaneously. Thus, each die D and D' may be provided with a peripheral flange or rib 25 having a narrow top and a central transverse flange or rib 26, having a groove 27 which may be V-shaped, as shown, or may be rectangular or have any other desired shape, so that the strips 16 and 17 will be sealed along lines corresponding to the surface of flange 26 on each side of groove 27, through the action of the heat transmitted therethrough, and will therefore form a division line between adjacent packages to facilitate cutting the packages apart. Of course, the top surface of flanges 26 could be solid, but this would require additional heat and also tend to detract from the production of clean, solid sealing lines. Each die may also be provided with a longitudinal, central upstanding flange or rib 28 and intermediate transverse flanges or ribs 29, each provided with a groove 30, similar to groove 27 and with groove 30 in flange 28 merging with groove 27 at the point of intersection of flanges 26 and 28. As will be evident, flanges 25, 26, 28 and 29 divide the working surface of the die into eight equal squares and the eight generally square wells or spaces 31 thereby provided form openings in which the butter pats are suspended during the sealing operation, thereby preventing sealing except along the lines desired. As will be evident, flanges 25, 26, 28 and 29 will cause strips 16 and 17 to be sealed along the line 13 of each of the eight packages to be sealed.

In order to produce sealing along line 15 of the package of Fig. 1, an upstanding button or post 32 of Fig. 4, provided with a shallow well 33 and a rim 34 surrounding the same, is disposed at the intersection of longitudinal flange 28 and each intermediate transverse flange 29, the grooves 30 of which extend into well 33. Thus, each rim 34 actually comprises four arcuate segments, each of which is adapted to seal strips 16 and 17 along a line 15 at the abutting corner of one of the four food packages to be. As indicated, the shape of the wells 31 is conveniently square, although they may be rectangular or have any desired dimensions, while additional series of wells, each series comprising four wells surrounding a central well 33 having a rim 34 may be added to each die. The central well 33 provided with the rim 34 is a valuable feature of this invention, since it permits four packages to be sealed simultaneously with one corner of each being sealed along a line spaced from the point of the corner. After sealing, the strips 16 and 17 are cut apart, as in the manner previously described, along lines corresponding to the centers of grooves 27 and 30, but directly across the former position of the wells 33. In this way, each package may be provided with a corner 14 of Fig. 2, at which the sheets may be readily grasped for ultimately opening the packages, since after cutting, the corners tend to turn up, due to the general arcuate sealing line 15.

Figure 5:
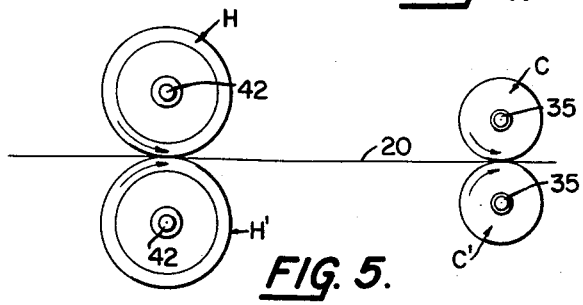
Fig. 5 is a diagrammatic representation of continuously operated apparatus, constructed in accordance with this invention.
Figure 6:
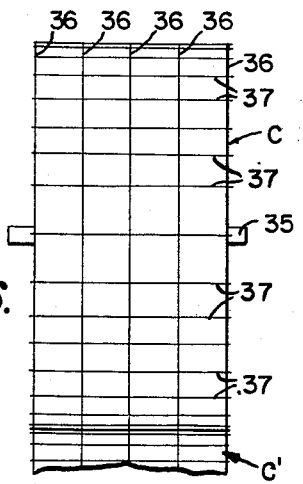
Fig. 6 is a diagrammatic front elevation of a pair of rotating cutting wheels forming a part of the apparatus of Fig. 5, the lower cutting wheel being shown fragmentarily.

The apparatus of Fig. 5 is adapted to be operated continuously, as indicated previously, through feeding of strips 16 and 17 of Fig. 4, with the butter pats 10 therebetween, along the line 20, between the rotating heating assemblies H and H' and then between the rotating cutting wheels or cutters C and C'. As in Fig. 6, each of the cutters C and C' may be mounted upon a shaft 35 and may be provided with a series of circumferential cutting edges 36 and transverse cutting edges 37, cutting edges 36 conveniently being formed by a series of discs having a sharpened periphery and provided with mounting means for a series of bars extending between adjacent discs and having sharpened outer edges to provide the transverse cutting edges 37. Or, all of the cutting edges 36 and 37 may be provided by plates having extending, sharpened flanges or ribs and suitably mounted on the periphery of a single disc or wheel, or formed in any other suitable manner.

Figure 7:
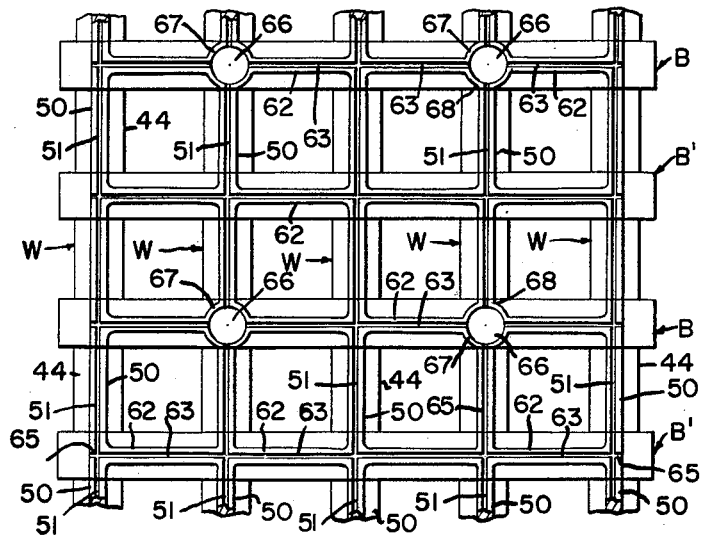
Fig. 7 is a plan view of a portion of the periphery of a heating assembly forming a part of the apparatus of Fig. 5.
Figure 8:
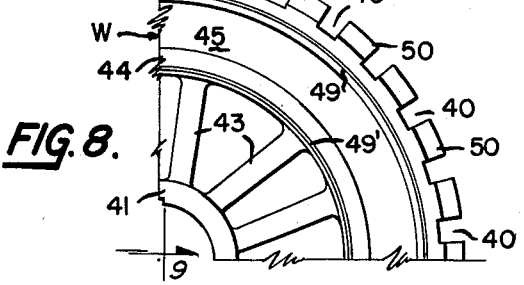
Fig. 8 is a fragmentary side elevation of a wheel, a number of which are used in each of the heating assemblies of Fig. 5.
Figure 9:
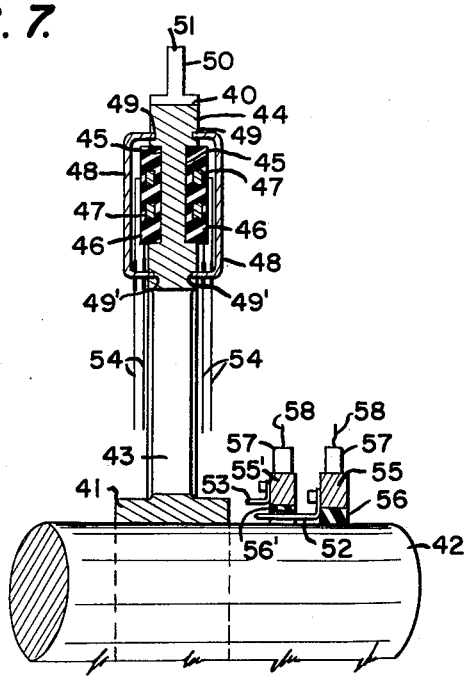
Fig. 9 is a fragmentary radial section, taken along line 9—9 of Fig. 8.

Each of the heating assemblies H and H' may comprise a series of wheels W, shown in Figs. 7-9, and a series of bars B and B' of Fig. 7, extending transversely across the peripheral edges of the wheels W and received in slots 40 of Fig. 8. As will be evident, the strips are sealed together along sealing lines produced by the peripheral edges of the wheels W and bars B and B', while the portion of the strips between the sealing lines, more directly enclosing the butter pats, are suspended during sealing within the spaces between the wheels W and bars B and B'. The wheels W of one heating assembly, preferably the upper heating assembly H, preferably have a slightly greater diameter than the wheels W of the other heating assembly, such as assembly H', to produce a rubbing action on the strips, which has been found to permit adequate sealing with less heat and pressure. Since as low sealing temperatures as possible are important, due not only to the desirability of limiting sealing to the precise lines or areas desired but also to the desirability of minimizing the heating of the food items, this feature is of particular importance. With both heating assemblies driven at the same rate of rotation, a difference in diameter on the order of 0.010 in. to 0.012 in.

has been found to permit a marked reduction in the temperature necessary for sealing. Each of the wheels W, as in Figs. 8 and 9, may be provided with a hub 41 adapted to be mounted upon a shaft 42 of Figs. 5 and 9, a series of spokes 43 conveniently extending outwardly to a rim 44 provided with an annular groove 45 on each side. As in Fig. 9, each groove 45 is adapted to receive a heating element 46, such as flat Nichrome wire 47 embedded in insulation and protected by a cover 48 attached to the rim 44, as by insertion of the edges thereof into grooves 49 and 49', shown also in Fig. 8. The periphery of rim 44 may comprise a series of outwardly extending flange segments 50, separated by the slots 40 which also preferably extend into the thicker portion of rim 44, as in Fig. 9. The peripheral edge of each flange segment 50 may be provided with a groove 51, which may be triangular, as shown, or rectangular or any other desired shape. The spokes 43 limit the amount of heat which may be transferred by conduction from rim 44 to hub 41 and shaft 42, which will be wasted heat, so that wheels having spokes will usually be found to be more economical than disc wheels. The spokes 43 also provide convenient spaces for passage of cables 52 and 53 and connection thereto of lead wires 54 for the heating elements 46, while cables 52 and 53 may be respectively connected to slip rings 55 and 55', conveniently mounted on insulating bushings 56 and 56' on shaft 42 adjacent an end wheel W, as in Fig. 7. Cable 52 may extend through a hole in bushing 56', while current may be supplied to slip rings 55 and 55' by brushes 57, each connected by a wire 58 to a suitable source of current. Of course, electricity may be supplied to the heating elements 46 in any other suitable manner.

Figure 3:
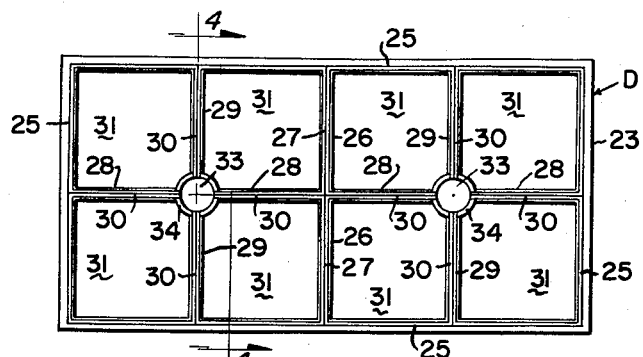
Fig. 3 is a top plan view of a lower die used in one form of apparatus constructed in accordance with this invention.
Figure 10:
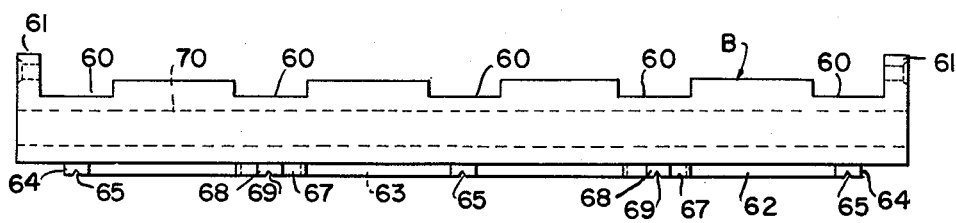
Fig. 10 is a side elevation of a bar, a number of which are also used in each of the heating assemblies of Fig. 5.
Figure 11:
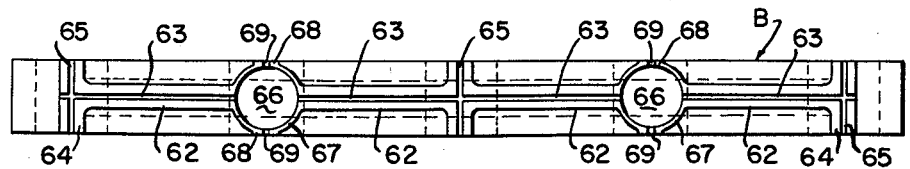
Fig. 11 is a plan view of the operating or working surface of the bar of Fig. 10.
Figure 12:
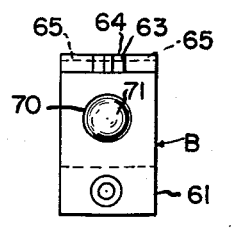
Fig. 12 is an end view of the bar of Fig. 10.

Each of the bars B may be constructed as shown in Figs. 10, 11 and 12, being conveniently formed from a rectangular block of suitable heat conducting material, such as copper or bronze, the wheels W and the dies D and D' of Figs. 3 and 4 being conveniently formed of the same or other similarly suitable material. Each of the bars B, as in Fig. 10, may be provided with a series of slots 60 which engage the wheel rims 44 and a flange 61 at each end to permit attachment to the rim of each outer wheel W, as by bolts. The operating surface of each bar B may comprise a ridge 62 extending lengthwise of the bar and provided with a groove 63 along its center, which groove may be rectangular in shape, as in Fig. 12, or may be a V-slot. A series of cross ridges 64 may be formed integrally with ridges 62 and each may be provided with a groove 65 connecting with groove 63, the cross ridges 63 being placed at the position of the two outer and the middle wheel W and having the same width as flange segments 50 and the grooves 65 thereof being in alignment with the grooves 51 of the flange segments 50, as will be evident from Fig. 7. At the position of each intermediate wheel W, a cylindrical or circular well 66, which is surrounded by an annular rim 67 but into which grooves 63 extend, performs the same function as a well 33 and rim 34 of the die D of Fig. 3, i.e., the rim 67 forms the sealing line 15 of each of four abutting food packages prior to severance of the strips. An abutment 68 provided with a groove 69 may also be disposed on the front and rear sides of each rim 67 so as to abut the adjacent flange segment 50 of the corresponding wheel W, as in Fig. 7. As will be evident, the assembly of the wheels W and bars B forms a ridge and groove pattern similar to that of the die D. The alternate bars B' are similar in construction to the bars B, except that wells 66 and rims 67 are omitted and a cross ridge 64 is disposed at the position of each of the intermediate wheels W. Each of bars B and B' may also be provided with a hole 70 extending lengthwise therethrough and shown more clearly in Fig. 12, to receive an electrical heating element 71, the lead wires of which may be connected to cables 52 and 53 of Fig. 7, or electricity supplied thereto in any other suitable manner. In some instances, it may be found that the heat supplied by heating elements 71 of bars B and B' is sufficient or nearly so, and that part or all of heating elements 46 on wheels W may be eliminated or disconnected.

As will be evident, when the strips 16 and 17, with the butter pats 10 therebetween, are moved through the heating assemblies H and H', as along the line 20 of Fig. 5, successive increments of the strips will be sealed together along lines enclosing each butter pat with an arcuate sealing line 15 of Fig. 1 being formed at the corner of each of four abutting packages, at two positions on each bar B, while bars B' will form the sealing line 13 along the edge of each package diagonally opposite each corner 14. As will be further evident, when the strips are then passed between the cutting wheels C and C', the individual packages will be severed from the remainder of the strip and the forces tending to cause the corners 14 of Fig. 2 to separate from each other can then come into play, to cause such separation and facilitate the opening of the packages later.

During the sealing and cutting operations, the food item disposed between the strips is, of course, protected by the strips from contamination, and as soon as sealing lines 13 and 15 are formed, the food items are individually sealed. After discharge from the cutters C and C', the packages may be handled in any desired manner, such as stacked in lots of predetermined number or weight or placed in suitable larger packages for distribution. Thus, the individual packages discharged from cutters C and C' may be fed by a belt to automatic packaging machinery of a suitable type.

From the foregoing, it will be evident that the apparatus of this invention fulfills to a marked degree the requirements and objects hereinbefore set forth. The sealed food packages produced may be handled manually and stored, stacked or shipped in any desired manner without contamination of the food item enclosed therein. Also, if such packages are placed in a bowl of ice, for instance, the water resulting from melting of the ice will not humidify or wet the food item, if the material of the strips from which the upper and lower sheets of the food packages are made is waterproof, as in the case of cellophane, Pliofilm and numerous other heat sealable materials. As indicated, the food package is readily opened by the user, particularly since the preferably generally arcuate sealing line at the free corner tends to cause the corners of the upper and lower sheets to spread apart. The apparatus of this invention may be readily operated under sanitary conditions, since the food items, such as butter pats, may be placed on the lower strip by machine and the heating dies, heating assemblies or the like, as well as the cutting blades or cutting wheels, can be maintained in sterile condition, as well as the strips from which the sheets enclosing the food items are produced. The apparatus of this invention may be operated intermittently or continuously to produce the food packages economically on a production basis. Particularly when sealing lines are formed about four food items enclosed by strip portions which are disposed radially about a common point, the heating dies, heating assemblies or the like are simpler to manufacture, although ridges or the like for forming the sealing lines for individual packages without regard to adjacent packages to be, may be utilized.

As will be evident, numerous variations may be made. Thus, the heating die or heating assembly used in the machine may vary in construction from the preferred embodiments illustrated and described. For instance, the wells in the heating dies may extend only partially through the dies, while the electrical heating units may conform in shape to the rear sides of the dies. The heating assemblies may be cylindrical drums mounted on discs or wheels with the outer periphery machined or otherwise formed so as to provide the preferred grooved ridges and wells. Also, heating means other than electrical heating means may be utilized, such as gas flames directed against the rear surface of the dies if solid, as when the wells extend only partially through the dies, or gas flames may be directed against the inside of a drum, on the outer periphery of which the preferred strip contacting surfaces are formed, such as in the manner indicated above. The transverse bars of the preferred construction of the heating assemblies may also be attached to the wheels in any other suitable manner, as by welding, while the bars may be individual pieces extending between adjacent wheels, rather than across all of the wheels. Other changes and variations will, of course, suggest themselves to those skilled in the art.

Although different embodiments of this invention have been illustrated and described, it will be understood that other embodiments may exist and that variations therein other than those indicated may be made, without departing from the spirit and scope of this invention.

What is claimed is:

1. In apparatus for producing closed packages containing food items tending to be affected by heat, from upper and lower strips formed of heat sealable material and between which said food items are disposed in spaced relation, a heating device for sealing said strips together around each of four food items disposed in radial positions about a central point, said heating device sealing said strips together along closely spaced lines at each of the abutting positions of the portions of said strips around said food items and along a line spaced from said central point at the common corner at said central point of said portions and being provided with a well surrounded by a rim for forming said sealing lines spaced from said central point and with a ridge provided with a groove disposed centrally of said ridge for forming said spaced sealing lines.

2. In apparatus for producing closed packages containing food items tending to be affected by heat, from upper and lower strips formed of heat sealable material and between which said food items are disposed in spaced relation, a pair of generally cylindrical heating assemblies rotating about parallel axes with the peripheries in substantially abutting relationship for sealing said strips together around at least four food items disposed in radial position about a central point, each heating assembly comprising a series of axially spaced wheels and a series of bars extending transversely across the periphery of said wheels and said heating assemblies sealing said strips together along each of the abutting positions of the portions of said strips around said food items.

3. In apparatus for producing closed packages containing food items, as defined in claim 2, wherein one heating assembly has a greater diameter than the other heating assembly.

4. In apparatus for producing closed packages containing food items, as defined in claim 2, wherein each said wheel is provided with a hub; a rim; spokes extending between said hub and rim; an electrical heating device extending annularly around said rim and disposed inwardly from said bars; and electrical leads for said heating devices extending between said spokes.

5. In apparatus for producing enclosed packages containing food items, as defined in claim 2, wherein each wheel is provided with a series of circumferentially extending flange segments separated by slots, each flange segment producing at least one sealing line between said strips; and each bar is provided with an outwardly extending ridge for producing at least one sealing line between said strips, each said bar being disposed in axially aligned slots of said wheels.

6. In apparatus for producing closed packages containing food items, from upper and lower strips formed of heat sealable material and between which said food items are disposed in spaced relation, a pair of dies mounted in opposed positions for reciprocating movement toward and away from each other so that the heating surfaces of said dies will engage said strips with said dies in closed position, each said die having a rectangular rim extending around the periphery thereof, a flange having a central groove extending centrally across said die, a series of three ridges having a central groove and extending transversely to said flange at equally spaced positions intermediate the ends of said die, each of said flanges and ridges being integral with said rim, and a post having a circular well surrounded by an annular rim at the point of intersection of the first and third of said second named ridges with said central flange, said grooves of said flange and said first and third ridges extending into said well and said grooves of said flange and the second of said ridges merging.

7. In apparatus for producing closed packages containing food items, from upper and lower strips formed of heat sealable material and between which said food items are disposed in spaced relation, a pair of rotating cylindrical heating assemblies mounted on parallel axes with the peripheries thereof in abutting relation, each said heating assembly comprising a series of equally spaced, coaxial wheels, each having a central hub, a series of radial spokes extending to a rim having an annular groove on each side and a series of equally spaced outwardly extending segments narrower than the remainder of said rim and separated by slots of equal width, each said segment having a central, circumferential slot in the outer periphery thereof; an annular electrical heating element in each said groove of each said wheel rim; electrical connections for said heating elements extending between said spokes to one end of said heating assembly; a first series of bars extending across the periphery of said wheels and mounted in alternate slots, each said bar having on its outer surface a longitudinally extending ridge provided with a central groove, a transverse ridge provided with a central groove in alignment with the adjacent segments of the first, third and fifth wheels, a well surrounded by an annular rim in alignment with the second and fourth wheels, with the groove of said longitudinal ridge extending into said well, and an abutment at each side of said well and provided with a groove extending into said well and in alignment with said grooves of the adjacent segments of said second and fourth wheels; a second series of bars extending across the periphery of said wheels and mounted in the remaining alternate slots, each of said second series of bars having on its outer surface a longitudinally extending ridge provided with a central groove and a transverse ridge at the position of each of said wheels and provided with a central groove merging with said groove of said longitudinal ridge, each said groove of each said transverse ridge being in alignment with the groove of the adjacent segments of the corresponding wheel; each of said first and second series of bars having a hole extending longitudinally therethrough; and an electrical heating element disposed in said hole of each said bar.

8. In apparatus for producing closed packages containing food items tending to be affected by heat, from upper and lower strips formed of heat sealable material and between which said food items are disposed in spaced relation, a pair of generally cylindrical heating assemblies rotating about parallel axes with the peripheries substantially in abutting relationship for sealing said strips together around at least four food items disposed in radial position about a central point, each heating assembly comprising a series of axially spaced wheels and a series of bars extending transversely across the periphery of said wheels, alternate bars being provided with a well surrounded by a rim for forming sealing lines spaced from the central point at the common corner of four food items and with a ridge provided with a groove disposed centrally of said ridge for forming said spaced sealing lines and the remaining bars being provided with ridges to produce spaced sealing lines along the boundaries between the portions of said strips disposed in one group of four food items and the next group of four food items disposed longitudinally of said strip, said heat sealing assemblies sealing said strips together along each of the abutting positions of the portions of said strips around said food items.

References Cited in the file of this patent

UNITED STATES PATENTS

| | | |
|---|---|---|
| 2,083,618 | Salfisberg | June 15, 1937 |
| 2,232,783 | Hausheer | Feb. 25, 1941 |
| 2,336,962 | Salfisberg | Dec. 14, 1943 |
| 2,468,517 | Salfisberg | Apr. 26, 1949 |
| 2,472,440 | Salfisberg | June 7, 1949 |
| 2,525,139 | Ligon | Oct. 10, 1950 |
| 2,525,651 | Clunan | Oct. 10, 1950 |
| 2,566,122 | Denison | Aug. 28, 1951 |
| 2,576,834 | Hensgen | Nov. 27, 1951 |
| 2,606,412 | Salfisberg | Aug. 12, 1952 |
| 2,637,959 | Dreher | May 12, 1953 |
| 2,737,764 | Lewis | Mar. 13, 1956 |

FOREIGN PATENTS

| | | |
|---|---|---|
| 577,151 | Great Britain | May 7, 1946 |